(12) United States Patent
Shoji

(10) Patent No.: US 8,146,734 B2
(45) Date of Patent: Apr. 3, 2012

(54) BELT UNIT AND IMAGE FORMING APPARATUS

(75) Inventor: Yuichi Shoji, Tokyo (JP)

(73) Assignee: Oki Data Corporation, Tokyo (JP)

( * ) Notice: Subject to any disclaimer, the term of this patent is extended or adjusted under 35 U.S.C. 154(b) by 741 days.

(21) Appl. No.: 12/232,194

(22) Filed: Sep. 12, 2008

(65) Prior Publication Data

US 2009/0078543 A1  Mar. 26, 2009

(30) Foreign Application Priority Data

Sep. 21, 2007  (JP) .................................. 2007-245102

(51) Int. Cl.
*B65G 23/44* (2006.01)

(52) U.S. Cl. .................................. 198/813; 198/861.2

(58) Field of Classification Search .................. 198/813, 198/861.2, 861.3
See application file for complete search history.

(56) References Cited

U.S. PATENT DOCUMENTS

| | | | | |
|---|---|---|---|---|
| 2,270,000 A | * | 1/1942 | Danker | 198/813 |
| 3,694,068 A | * | 9/1972 | Jordan | 198/813 |
| 3,930,323 A | * | 1/1976 | Marold et al. | 198/813 |
| 4,128,952 A | * | 12/1978 | Duke et al. | 198/813 |
| 4,846,338 A | * | 7/1989 | Widmer | 198/813 |
| 5,022,514 A | * | 6/1991 | Lofberg | 198/813 |
| 5,609,238 A | * | 3/1997 | Christensen | 198/816 |
| 5,787,709 A | * | 8/1998 | Watanabe et al. | 60/313 |
| 6,269,231 B1 | * | 7/2001 | Castelli et al. | 198/813 |
| 6,409,011 B1 | * | 6/2002 | Ferguson | 198/861.3 |
| 6,958,452 B2 | * | 10/2005 | Takahashi | 198/813 |

FOREIGN PATENT DOCUMENTS

| | | |
|---|---|---|
| JP | 61-020971 | 1/1986 |
| JP | 62-65671 U | 4/1987 |
| JP | 2002-060039 | 2/2002 |
| JP | 2003-131493 A | 5/2003 |
| JP | 2003-195649 | 7/2003 |
| JP | 2007-041402 A | 2/2007 |
| JP | 2007-057953 | 3/2007 |

* cited by examiner

*Primary Examiner* — James R Bidwell
(74) *Attorney, Agent, or Firm* — Kubotera & Associates, LLC

(57) ABSTRACT

A belt unit includes a first roller; a second roller; a belt extended with at least the first roller and the second roller; a first supporting member for supporting the first roller; a second supporting member disposed to be freely rotatable relative to the first supporting member for supporting the second roller; a switching member for switching the first supporting member and the second supporting member between a first state for applying tension to the belt and a second state for loosening the belt; and a regulating member for regulating the second supporting member to rotate.

26 Claims, 12 Drawing Sheets

BELT UNIT AND IMAGE FORMING APPARATUS

BACKGROUND OF THE INVENTION AND RELATED ART STATEMENT

The present invention relates to a belt unit and an image forming apparatus having the belt unit.

In a conventional image forming apparatus such as a printer, a copier, a facsimile, and the likes, a charge roller charges a surface of a photosensitive drum, and an LED (Light Emitting Diode) head exposes the surface of the photosensitive drum to form a static latent image thereon. Then, a developing roller attaches a thin layer of toner to the static latent image through static electricity, thereby forming a toner image. A transfer roller transfers the toner image to a sheet, and a fixing device fixes the toner image to the sheet, thereby forming an image on the sheet. After the transfer roller transfers the toner image to the sheet, a cleaning device removes toner remaining on the photosensitive drum.

In the printer described above, image forming units are disposed for forming toner images in colors, and the sheet is transported along the image forming units. To this end, a belt unit is disposed along the image forming units. The belt unit includes a drive roller, an idle roller, and a transfer belt extended between the drive roller and the idle roller. When the drive roller rotates, the transfer belt moves, thereby transporting the sheet. Further, a tension mechanism is disposed for applying a tensional force or tension to the transfer belt (refer to Patent Reference).

Patent Reference: Japan Patent Publication No. 2002-60039

SUMMARY OF THE INVENTION

According to the present invention, a belt unit includes a first roller; a second roller; a belt extended with at least the first roller and the second roller; a first supporting member for supporting the first roller; a second supporting member disposed to be freely rotatable relative to the first supporting member for supporting the second roller; a switching member for switching the first supporting member and the second supporting member between a first state for applying tension to the belt and a second state for loosening the belt; and a regulating member for regulating the second supporting member to rotate.

In the present invention, the belt unit includes the first roller; the second roller; the belt extended with at least the first roller and the second roller; the first supporting member for supporting the first roller; the second supporting member disposed to be freely rotatable relative to the first supporting member for supporting the second roller; the switching member for switching the first supporting member and the second supporting member between the first state for applying tension to the belt and the second state for loosening the belt; and the regulating member for regulating the second supporting member to rotate.

In the present invention, when the switching member is operated, it is possible to switch the first supporting member and the second supporting member between the first state for applying tension to the belt and the second state for loosening the belt. Accordingly, for example, in a case of waiting for a next step or delivery in a manufacturing process of the belt unit, it is possible to situate the first supporting member and the second supporting member in the second state, thereby preventing tension from being applied to the belt.

DETAILED DESCRIPTION OF THE PREFERRED EMBODIMENTS

Hereunder, embodiments of the present invention will be described in detail with reference to the accompanying drawings. In the following description, a color printer will be explained as an image forming apparatus.

First Embodiment

Figure 2:
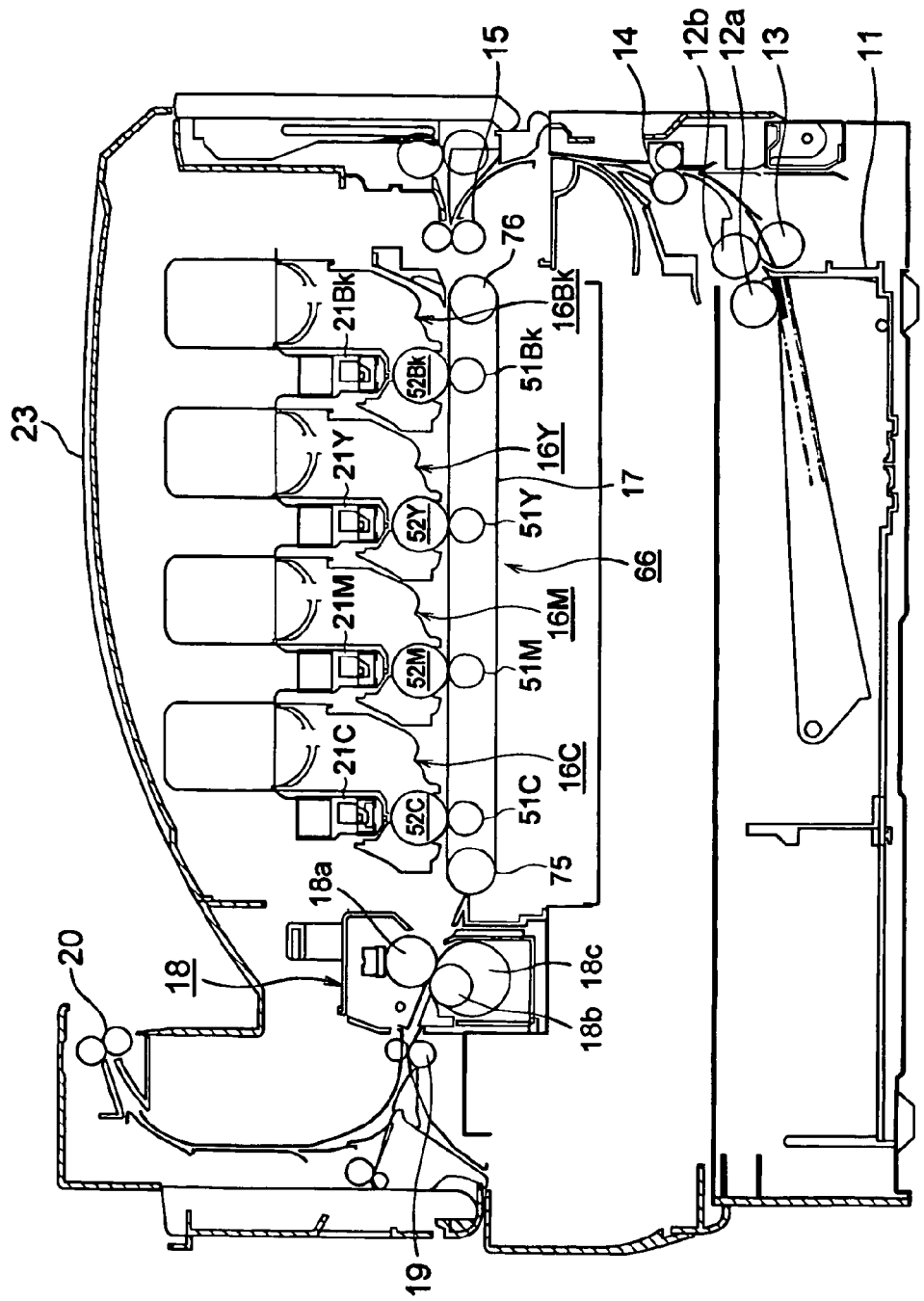
FIG. 2 is a schematic view showing a printer according to the first embodiment of the present invention.

A first embodiment of the present invention will be explained. FIG. 2 is a schematic view showing a printer according to the first embodiment of the present invention.

As shown in FIG. 2, a sheet supply cassette 11 as a medium storage unit is disposed at a lower portion of a main body of the printer or an apparatus main body for storing a sheet (not shown) as a medium. A sheet supply mechanism as a medium supply unit is disposed adjacent to a front end portion of the sheet supply cassette 11 for separating and supplying the sheet one by one.

In the embodiment, the sheet supply mechanism includes supply rollers 12a and 12b and a separation roller 13. When a sheet supply motor (not shown) as a drive unit drives the sheet supply rollers 12a and 12b to rotate, the sheet supply rollers 12a and 12b transport the sheet to a transportation roller unit 14 as a print timing adjusting unit disposed at an upper portion of the printer. After the sheet is further transported to a transportation roller unit 15, the sheet is sequentially transported between a transfer unit 66 as a belt unit or a transfer device and a plurality of image forming units 16Bk, 16Y, 16M, and 16C as image forming devices for forming toner images as developer images in black, yellow, magenta, and cyan.

In the embodiment, the transfer unit 66 includes a drive roller 75 as a first roller; an idle roller 76 as a second roller; a transfer belt 17 as a first transfer member or a belt extended between the drive roller 75 and the idle roller 76; and a belt motor (not shown) as a transportation drive unit for rotating transfer rollers 51Bk, 51Y, 51M, and 51C as second transfer members and the drive roller 75. The transfer rollers 51Bk, 51Y, 51M, and 51C are arranged to face photosensitive drums 52Bk, 52Y, 52M, and 52C as image supporting members. Note that the transfer belt 17 functions as a transportation member as well for transporting the sheet.

In the image forming units 16Bk, 16Y, 16M, and 16C, the photosensitive drums 52Bk, 52Y, 52M, and 52C form the toner images as the developer images in each color using toner as developer in each color, and the transfer rollers 51Bk, 51Y, 51M, and 51C sequentially transfer the toner images to the sheet, thereby forming a color toner image on the sheet.

In the embodiment, the transfer belt 17 is extended with the drive roller 75 and the idle roller 76. Alternatively, an auxiliary tension member such as a tension roller and the likes may be disposed for adjusting tension of the transfer belt 17.

Afterward, the sheet is transported to a fixing device 18, so that the color toner image is fixed to the sheet in the fixing device 18, thereby forming a color image on the sheet. To this end, the fixing device 18 includes a heating roller 18a as a third roller; a pressing roller 18b as a fourth roller; a fixing belt 18c disposed around the pressing roller 18b to be movable; and a halogen lamp (not shown) as a heating member disposed in the heating roller 18a.

After the sheet is discharged from the fixing device 18, a transportation roller 19 transports the sheet, and a discharge transportation roller 20 discharges the sheet outside the printer. Through the process described above, the color printing operation is performed.

In the embodiment, LED (Light Emitting Diode) heads 21Bk, 21Y, 21M, and 21C as exposure devices are disposed to face the photosensitive drums 52Bk, 52Y, 52M, and 52C for exposing surfaces of the photosensitive drums 52Bk, 52Y, 52M, and 52C to form a static latent image.

In the embodiment, the image forming units 16Bk, 16Y, 16M, and 16C are detachably attached to the apparatus main body, and a main body cover 23 is disposed at an upper portion of the apparatus main body to be freely opened and closed. The main body cover 23 supports the LED (Light Emitting Diode) heads 21Bk, 21Y, 21M, and 21C.

When the printer performs a monochrome printing operation, a link mechanism and a link drive motor (not shown) move the image forming units 16Y, 16M, and 16C away from the transfer unit 66, so that only the image forming unit 16Bk is used. In this case, the image forming units 16Y, 16M, and 16C move away from the transfer unit 66 by a limited distance, thereby minimizing a size of the printer.

When the transfer belt 17 is formed of a resin, if the transfer belt 17 stays under a state that specific tension is applied thereto for a long period of time, for example, in waiting for a next step or delivery in a manufacturing process of the transfer unit 66, or if the transfer unit 66 stays under a high temperature and a high humidity, the transfer belt 17 may form a curled portion. When the transfer belt 17 forms a curled portion, print quality may be deteriorated.

Figure 3:
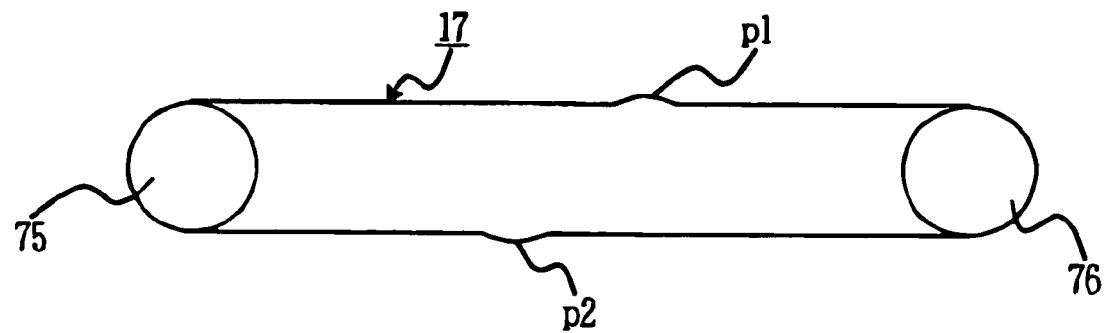
FIG. 3 is a schematic view showing a transfer belt having a curled portion according to the first embodiment of the present invention.

FIG. 3 is a schematic view showing the transfer belt 17 having a curled portion according to the first embodiment of the present invention. As shown in FIG. 3, the transfer belt 17 is placed between the drive roller 75 and the idle roller 76, and the transfer belt 17 has curled portions p1 and p2.

When the transfer belt 17 stays under a state that specific tension is applied thereto with the drive roller 75 and the idle roller 76 for a long period of time, portions of the transfer belt 17 contacting with the drive roller 75 and the idle roller 76 tend to elongate, thereby forming the curled portions p1 and p2. After the curled portions p1 and p2 are formed, the transfer belt 17 moves in a state that the curled portions p1 and p2 protrude from other portion of the transfer belt 17 due to deformation thereof.

In particular, if the transfer unit 66 stays under a high temperature and a high humidity, when an external force exceeding an allowance stress (an elastic limit) of a material of the transfer belt 17 is applied to the transfer belt 17, the transfer belt 17 itself may be elongated. When the transfer belt 17 in an elongated state is used for the printing operation, print quality may be deteriorated due to the curled portion or the elongation.

In the monochrome printing operation, when the image forming units 16Y, 16M, and 16C move away from the transfer unit 66 for an insufficient distance, and the transfer belt 17 having the curled portions p1 and p2 is used, a printing surface of the sheet may slide against lower surfaces of the image forming units 16Y, 16M, and 16C due to the curled portions p1 and p2, thereby deteriorating print quality.

In the embodiment, it is configured such that it is possible to prevent the transfer belt 17 from forming the curled portions p1 and p2 even through the transfer belt 17 stays under a state that specific tension is applied thereto for a long period of time.

Figure 1:
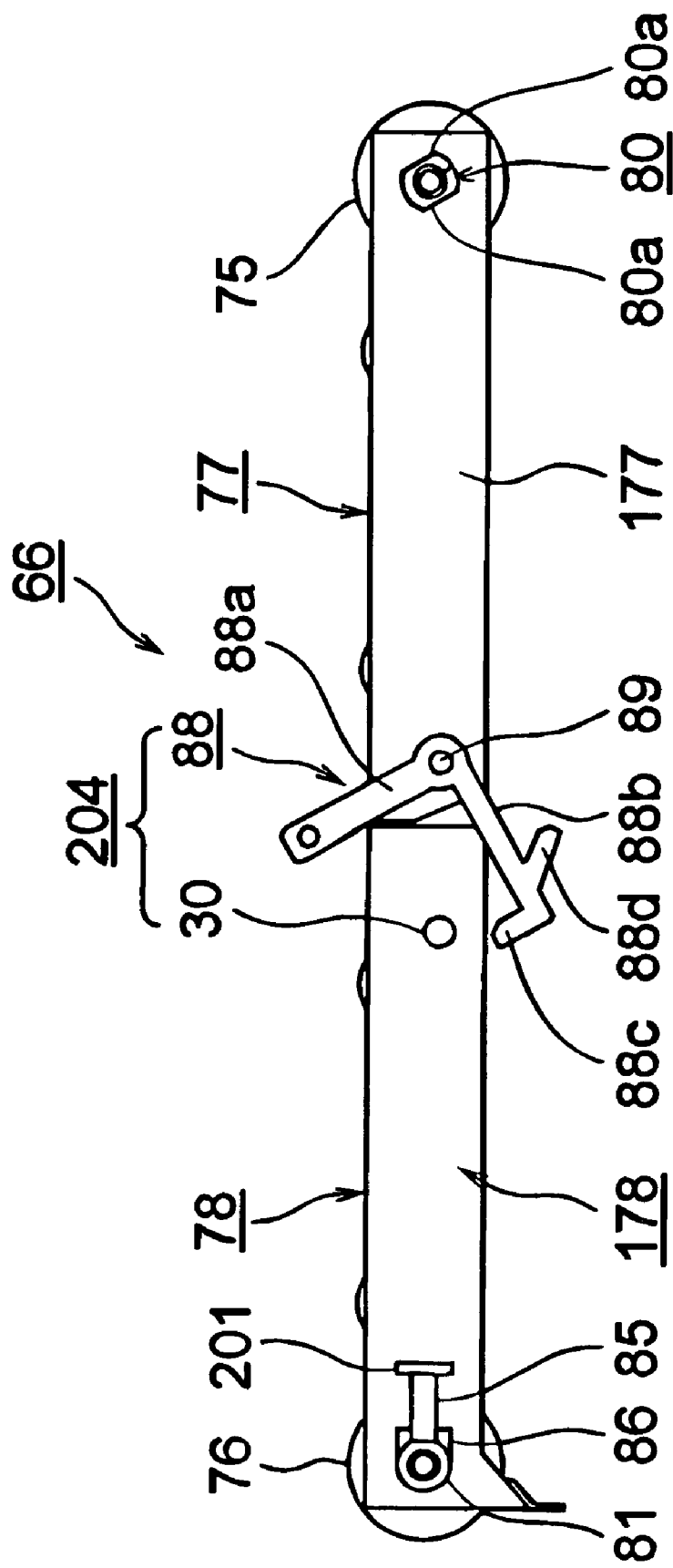
FIG. 1 is a schematic front view showing a transfer unit according to a first embodiment of the present invention.
Figure 4:
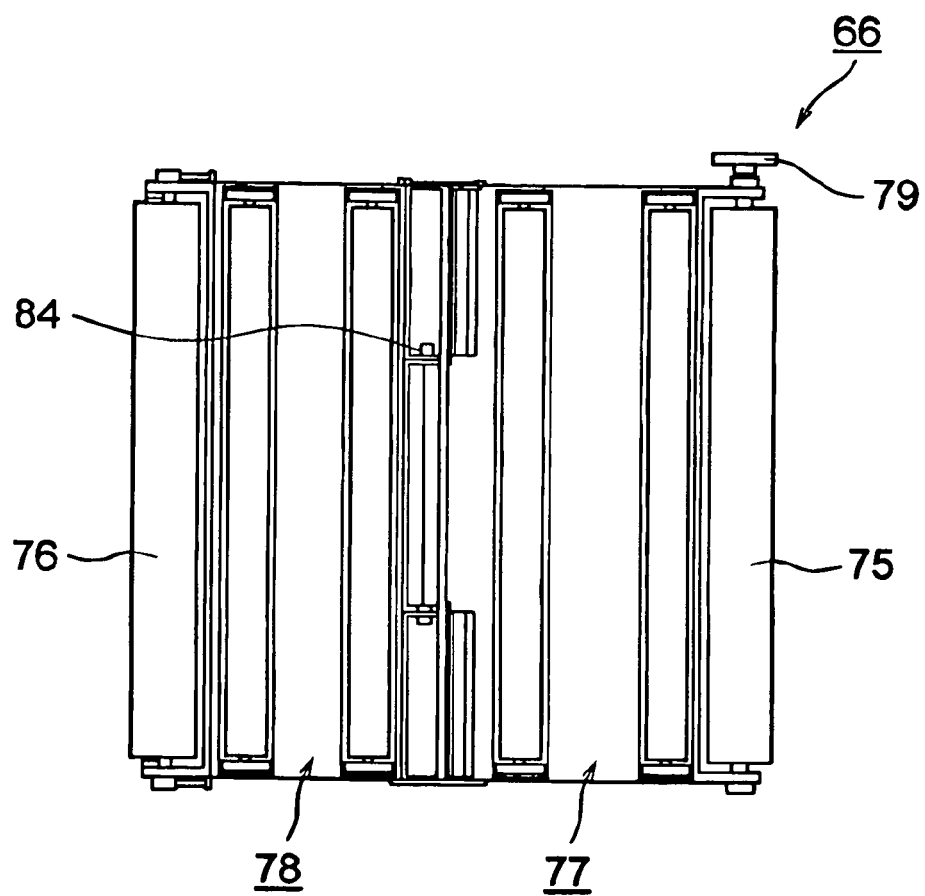
FIG. 4 is a schematic plan view showing the transfer unit according to the first embodiment of the present invention.

A configuration of the transfer unit 66 will be explained next. FIG. 1 is a schematic front view showing the transfer unit 66 according to the first embodiment of the present invention. FIG. 4 is a schematic plan view showing the transfer unit 66 according to the first embodiment of the present invention.

Figure 5:
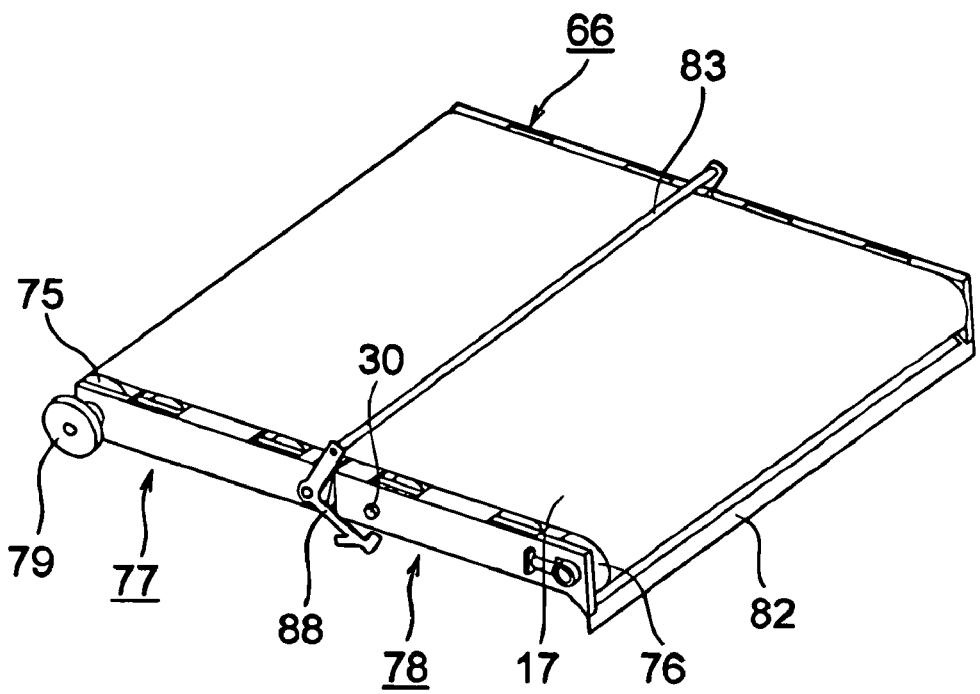
FIG. 5 is a schematic perspective view showing the transfer unit according to the first embodiment of the present invention.
Figure 6:
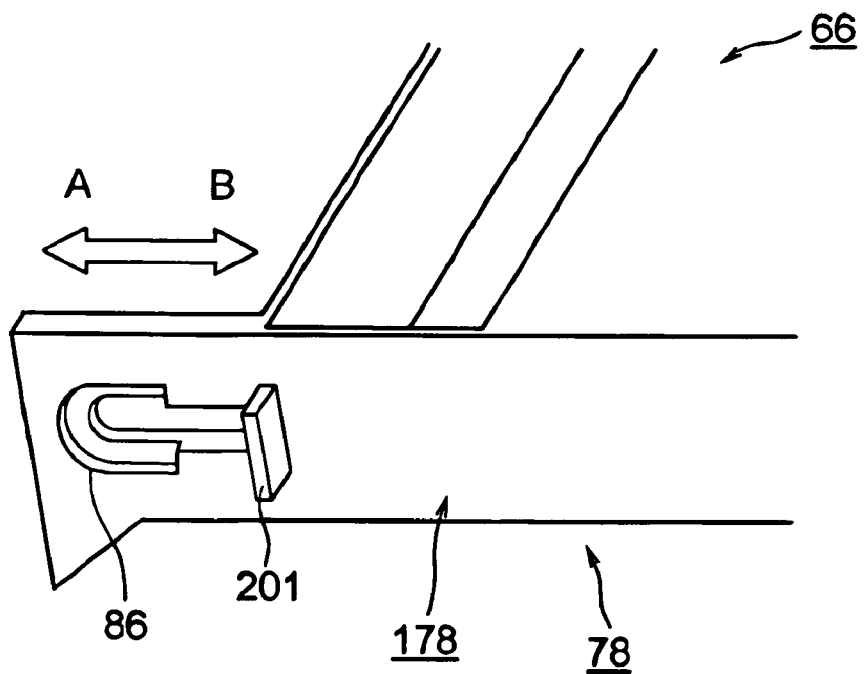
FIG. 6 is an enlarged schematic perspective view showing the transfer unit according to the first embodiment of the present invention.
Figure 7:
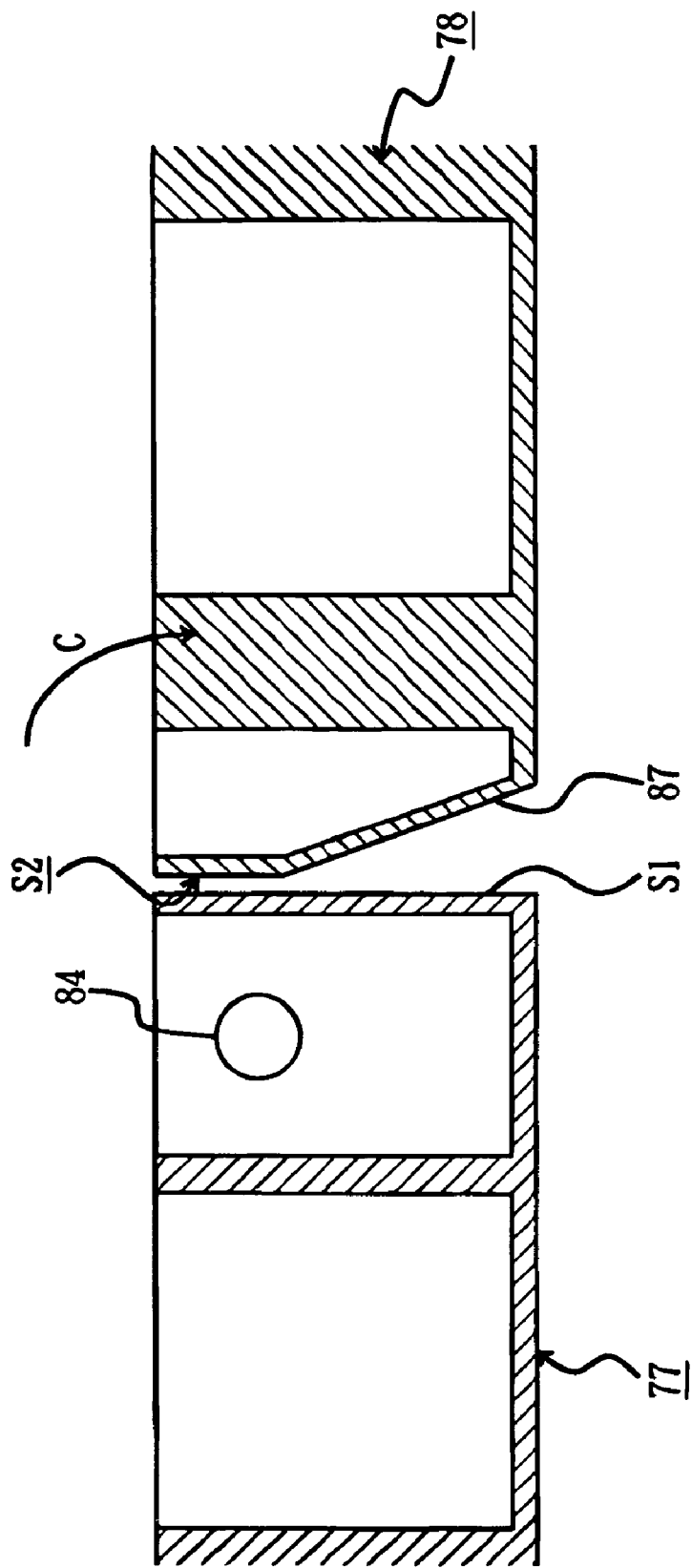
FIG. 7 is a schematic sectional view showing a first belt unit and a second belt unit in a first state according to the first embodiment of the present invention.
Figure 8:
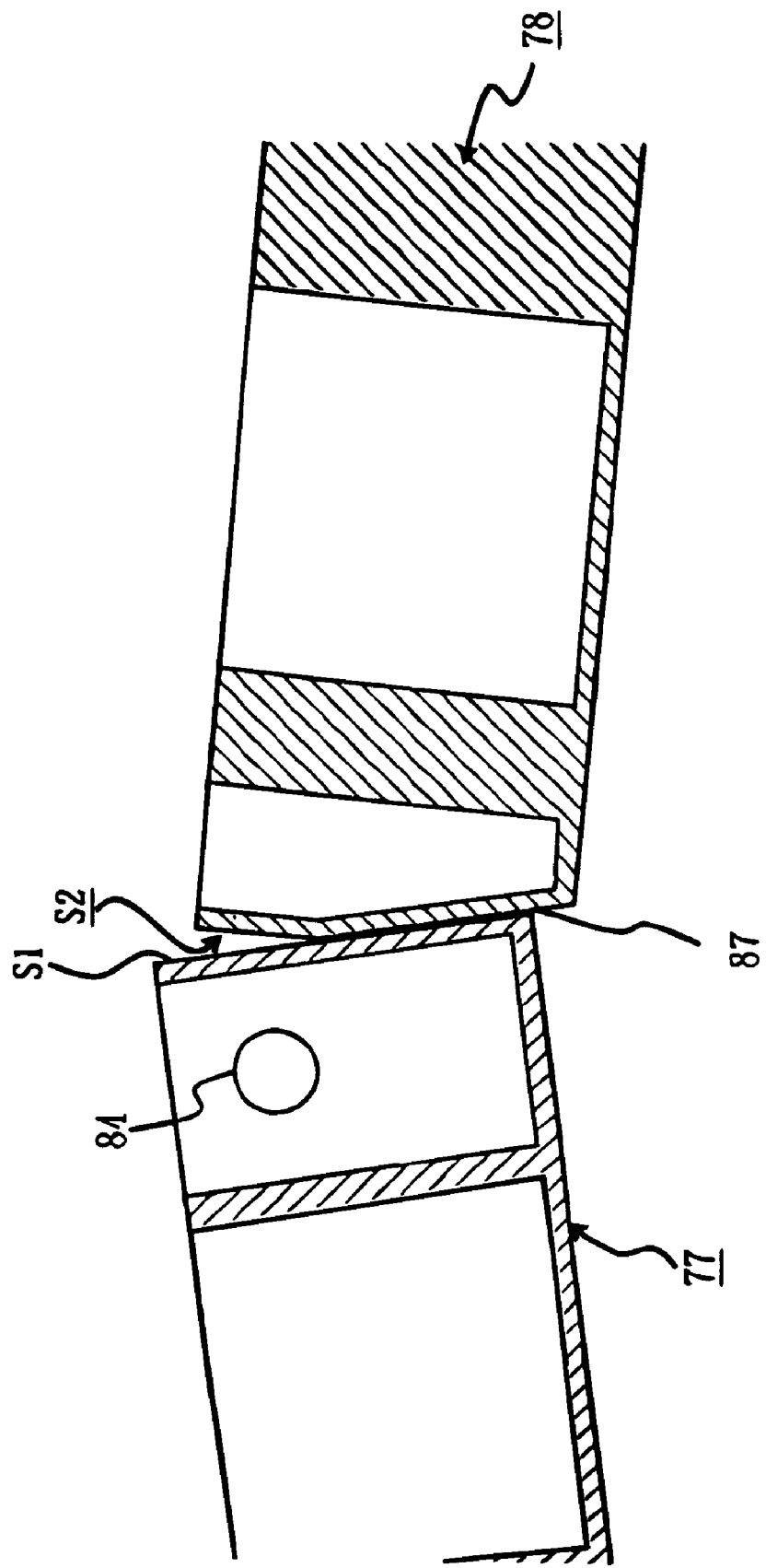
FIG. 8 is a schematic sectional view showing the first belt unit and the second belt unit in a second state according to the first embodiment of the present invention.

FIG. 5 is a schematic perspective view showing the transfer unit 66 according to the first embodiment of the present invention. FIG. 6 is an enlarged schematic perspective view showing the transfer unit 66 according to the first embodiment of the present invention. FIG. 7 is a schematic sectional view showing a first belt unit 77 and a second belt unit 78 in a first state according to the first embodiment of the present invention. FIG. 8 is a schematic sectional view showing the first belt unit 77 and the second belt unit 78 in a second state according to the first embodiment of the present invention.

As shown in FIG. 1, the transfer unit 66 includes the first belt unit 77 as a first supporting member and the second belt unit 78 as a second supporting member linked to the first belt unit 77. The first belt unit 77 includes the drive roller 75, and the second belt unit 78 includes the idle roller 76, so that the drive roller 75 and the idle roller 76 extend the transfer belt 17 in a state that the transfer belt 17 is disposed around the drive roller 75 and the idle roller 76.

In the embodiment, in the first belt unit 77, the drive roller 75 is supported on a bearing 80 to be freely rotatable relative to a side plate 177. A drive gear 79 is attached to one end portion of an axis of the drive roller 75, and the drive gear 79 is connected to the belt motor. The bearing 80 has a section having an I character shape, and includes two parallel surfaces 80a fixed to the side plate 177.

In the embodiment, in the second belt unit 78, a long hole 86 extending in arrow directions A and B as shown in FIG. 6 is formed in a side plate 178. The idle roller 78 is supported on a bearing 81 as a supporting member to be slidable in the arrow directions A and B relative to the side plate 178 and the long hole 86. The bearing 81 has a circular shape.

In the embodiment, a pressing spring 85 as an urging member is disposed between the bearing 81 and a supporting portion protruding from the side plate 178 for urging the idle roller 76 in the arrow direction A, thereby applying tension to the transfer belt 17. Further, the pressing spring 85 presses the idle roller 76 in a direction perpendicular to a direction that the transfer belt 17 moves.

In the embodiment, a cleaning blade 82 as a cleaning device is disposed in the second belt unit 78 for scraping off toner remaining on the transfer belt 17 upon forming an image on the sheet. The cleaning blade 82 is disposed to face the idle roller 76 with the transfer belt 17 in between, and to abut against the transfer belt 17.

In the embodiment, the second belt unit 78 is connected to the first belt unit 77 to be rotatable around a connection shaft 84. When the first belt unit 77 and the second belt unit 78 are situated in a linear state as shown in FIG. 7, the transfer unit 66 is refer to be situated in a first state in which tension is applied to the transfer belt 17. When the first belt unit 77 and the second belt unit 78 are situated in a bent state as shown in FIG. 8, the transfer unit 66 is referred to be situated in a second state in which the transfer belt 17 is loosened.

Note that the first state also refers to the linear state of the first belt unit 77 and the second belt unit 78, and the second state refers to the bent state of the first belt unit 77 and the second belt unit 78.

In the embodiment, the first belt unit 77 has a flat surface S1 facing the second belt unit 78, and the second belt unit 78 has a tapered portion 87 formed in a surface S2 facing the first belt unit 77. When the second belt unit 78 rotates in an arrow direction C relative to the first belt unit 77, the tapered portion 87 functions as a restricting member or a stopper for restricting a rotation of the first belt unit 77, so that the first belt unit 77 does not rotate beyond a specific angle. The specific angle is determined from a relationship between the transfer unit 66 in the apparatus main body and an attachment portion of the transfer unit 66, and may be set at, for example, 20°.

In the embodiment, lock units 204 are disposed between the first belt unit 77 and the second belt unit 78 at end portions (right and left) of the transfer unit 66 (refer to FIG. 5) for maintaining the transfer unit 66 in the second state.

The lock unit 204 includes a lock member 88 as an engagement member disposed on one of the first belt unit 77 and the second belt unit 78 (on the first belt unit 77 in the embodiment) to be freely rotatable around a pivot 89. The lock unit 204 further includes a protrusion 30 as an engaged member disposed on the other of the first belt unit 77 and the second belt unit 78 (on the second belt unit 78 in the embodiment). The lock member 88 constitutes a switching member for switching the transfer unit 66 between the first state and the second state.

In the embodiment, the lock member 88 includes a first arm portion 88a extending from the pivot 89; a second arm portion 88b extending from the pivot 89 at a specific angle (a right angle in the embodiment) relative to the first arm portion 88a; a hook portion 88c as a first engagement portion extending from a distal end portion of the second arm portion 88b in parallel to the first arm portion 88a; and a hook portion 88d as a second engagement portion disposed on the second arm portion 88b at a position slightly closer to the pivot 89 than the distal end portion thereof and extending obliquely in a direction opposite to the hook portion 88c.

When the transfer unit 66 is situated in the second state, the hook portion 88c engages the protrusion 30. A handle bar 83 connects distal portions of the first arm portions 88a, so that the lock members 88 disposed at the right and left end portions of the transfer unit 66 are connected with the handle bar 83 (refer to FIG. 5). The handle bar 83 is disposed to be freely rotatable together with the lock members 88.

When an operator grabs the handle bar 83 to lift the transfer unit 66, the hook portions 88d engage the protrusions 30. Accordingly, the lock units 204 function as a stopper member for preventing the first belt unit 77 and the second belt unit 78 from rotating beyond a specific angle.

Figure 9:
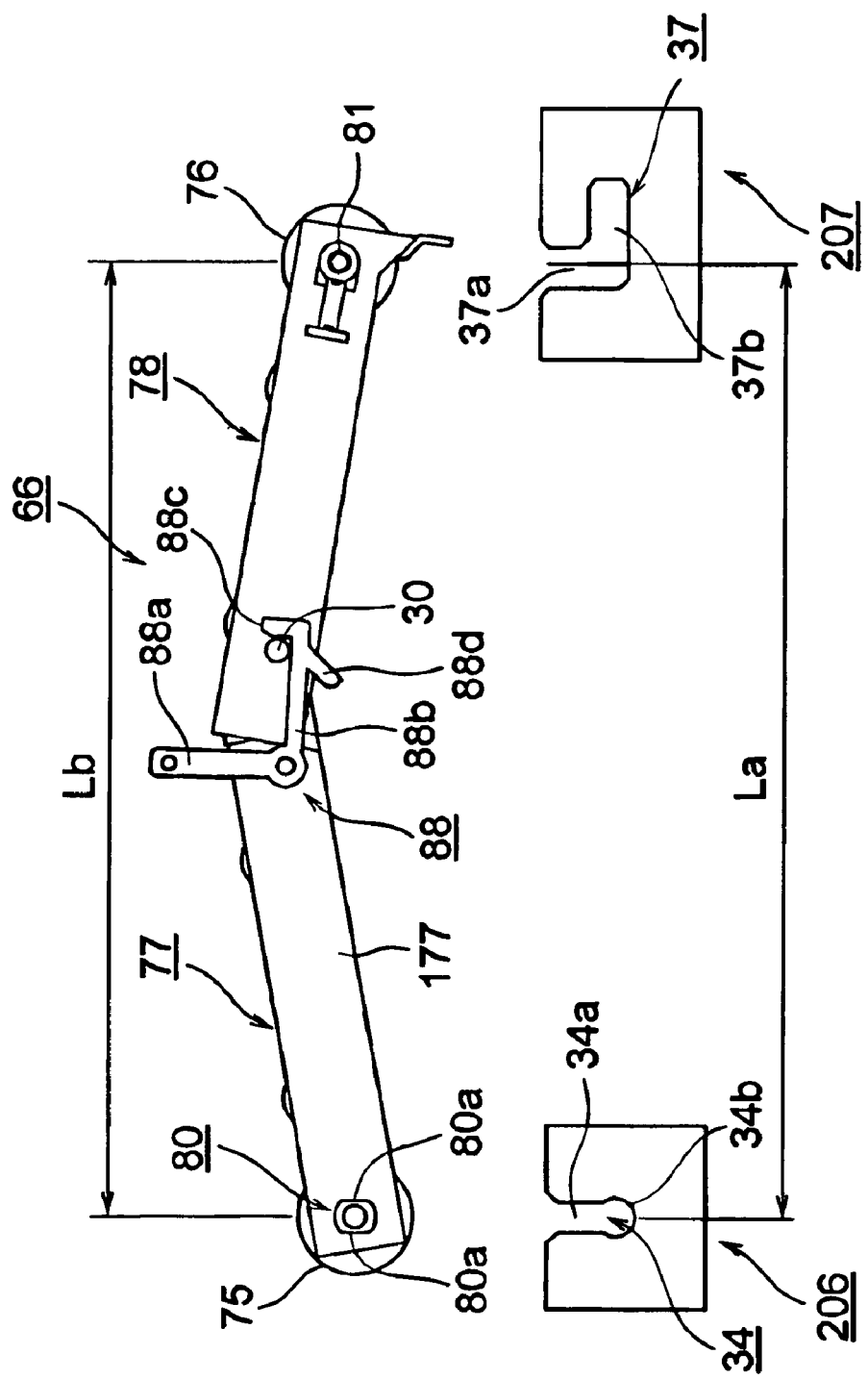
FIG. 9 is a schematic view No. 1 showing a method of attaching the transfer unit to the printer according to the first embodiment of the present invention.
Figure 10:
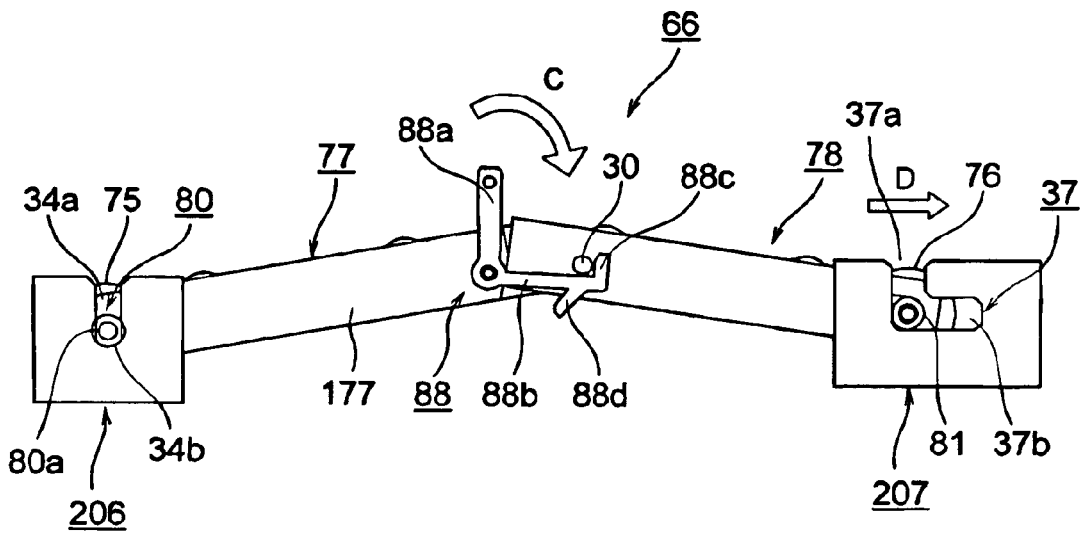
FIG. 10 is a schematic view No. 2 showing the method of attaching the transfer unit to the printer according to the first embodiment of the present invention.

An operation of attaching the transfer unit 66 to the apparatus main body will be explained next. FIG. 9 is a schematic view No. 1 showing a method of attaching the transfer unit 66 to the printer according to the first embodiment of the present invention. FIG. 10 is a schematic view No. 2 showing the method of attaching the transfer unit 66 to the printer according to the first embodiment of the present invention.

Figure 11:
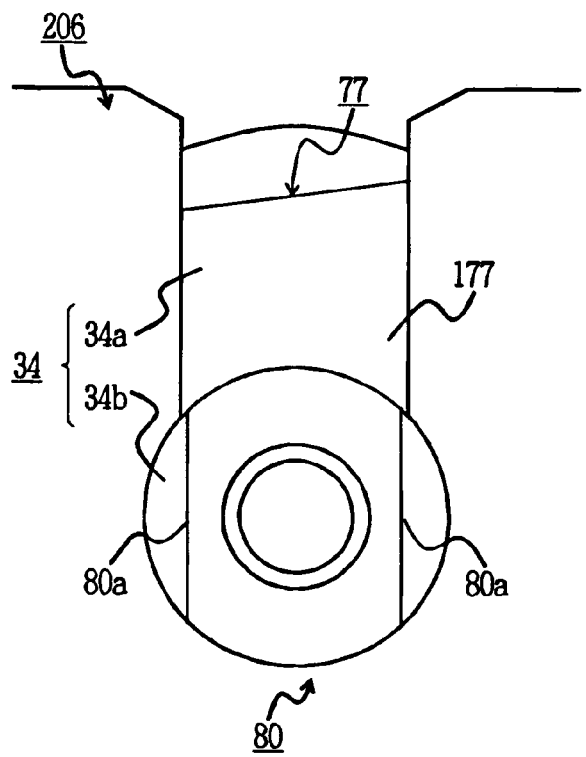
FIG. 11 is a schematic view No. 1 showing an attachment groove for attaching the transfer unit to the printer according to the first embodiment of the present invention.
Figure 12:
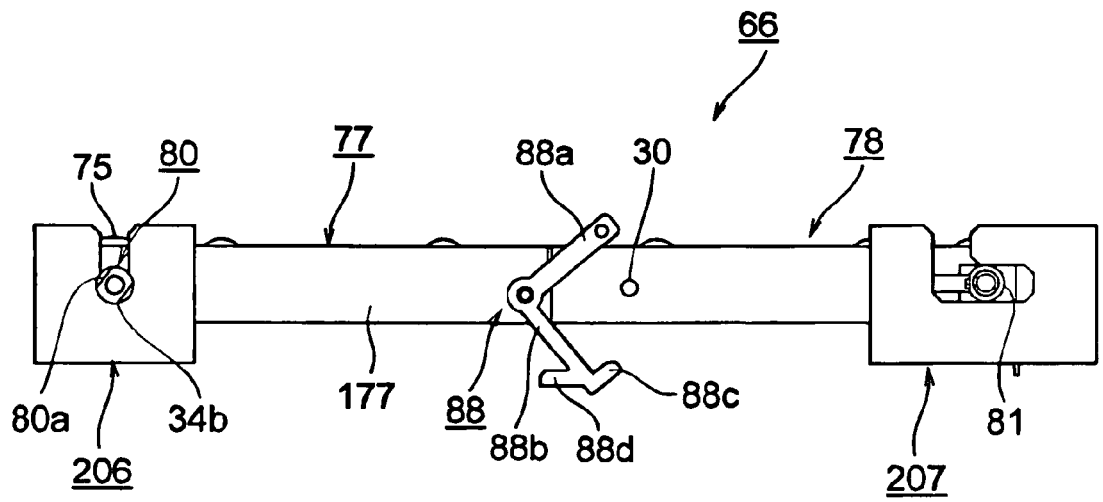
FIG. 12 is a schematic view No. 3 showing the method of attaching the transfer unit to the printer according to the first embodiment of the present invention.
Figure 13:
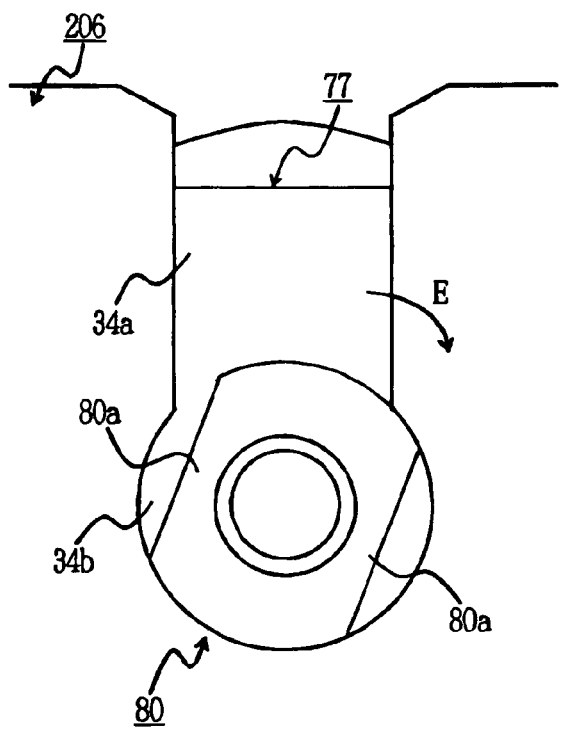
FIG. 13 is a schematic view No. 2 showing the attachment groove for attaching the transfer unit to the printer according to the first embodiment of the present invention.
Figure 14:
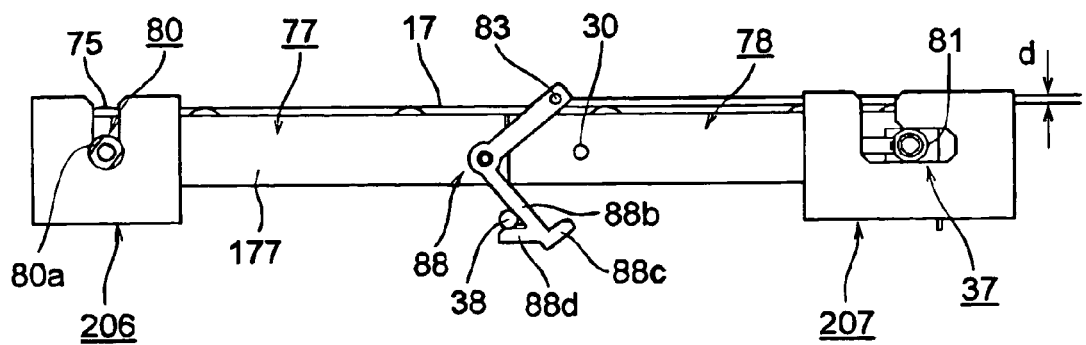
FIG. 14 is a schematic view No. 4 showing the method of attaching the transfer unit to the printer according to the first embodiment of the present invention.

FIG. 11 is a schematic view No. 1 showing an attachment groove for attaching the transfer unit 66 to the printer according to the first embodiment of the present invention. FIG. 12 is a schematic view No. 3 showing the method of attaching the transfer unit 66 to the printer according to the first embodiment of the present invention. FIG. 13 is a schematic view No. 2 showing the attachment groove for attaching the transfer unit 66 to the printer according to the first embodiment of the present invention. FIG. 14 is a schematic view No. 4 showing the method of attaching the transfer unit 66 to the printer according to the first embodiment of the present invention.

In the embodiment, attachment portions 206 and 207 are disposed on the apparatus main body at specific positions thereof for attaching and detaching the transfer unit 66 relative to the apparatus main body. The attachment portion 206 has an insertion groove 34 as a first groove for receiving and supporting the bearing 80. The insertion groove 34 extends in a vertical direction, and includes an introduction portion 34a for introducing the bearing 80 and a holding portion 34b for holding the bearing 80.

As described above, the bearing 80 has the I cut section having the I character shape, and includes the surfaces 80a. The introduction portion 34a has a width slightly larger than a distance between the surfaces 80a, so that the introduction portion 34a sandwiches the I cut section and receives the bearing 80. Further, the holding portion 34b has a size slightly larger than a diameter of the bearing 80, so that the bearing 80 freely rotates in the holding portion 34b.

In the embodiment, the attachment portion 207 has an insertion groove 37 as a second groove having an L character shape for receiving and supporting the bearing 81. The insertion groove 37 extends in a horizontal direction, and includes an introduction portion 37a for introducing the bearing 81 and a holding portion 37b extending from a bottom portion of the introduction portion 37a in a horizontal direction for holding the bearing 81. The introduction portion 37a and the holding portion 37b have sizes slightly larger than a diameter of the bearing 81, thereby introducing and holding the bearing 81 therein.

In the embodiment, when the insertion groove 34 is formed at a position away from the insertion groove 37 by a distance La, that is, a center of the introduction portion 34a is situated away from a center of the introduction portion 37b by the distance La, it is configured such that the distance La becomes equal to a distance Lb between centers of the bearing 80 and the bearing 81 when the first belt unit 77 and the second belt unit 78 are situated in the second state.

When the transfer unit 66 is attached to the apparatus main body, an operator grabs the handle bar 83, so that the bearing 80 and the bearing 81 are inserted into the insertion groove 34 and the insertion groove 37 as shown in FIG. 10, respectively. At this moment, the transfer unit 66 is situated in the second state, and the bearing 80 is disposed on the side plate 177 such that the surfaces 80a are aligned in the vertical direction. Accordingly, as shown in FIGS. 10 and 11, the bearing 80 passes through the introduction portion 34a and reaches the holding portion 34b, thereby being accommodated in the holding portion 34b. At the same time, the bearing 81 passes through the introduction portion 37a and reaches the bottom portion.

In the next step, when the transfer unit 66 is pushed down while the lock member 88 is rotated in the arrow direction C, the hook portion 88c is disengaged from the protrusion 30. Accordingly, the first belt unit 77 and the second belt unit 78 become linear, and the transfer unit 66 becomes the first state. When the first belt unit 77 and the second belt unit 78 become linear, the bearing 80 rotates in the holding portion 34a in an arrow direction E as shown in FIG. 13, thereby inclining the surfaces 80a. As a result, the bearing 80 does not come off from the insertion groove 34.

Further, as shown in FIG. 10, the bearing 81 moves in the insertion groove 37 in an arrow direction D and is accommodated in the holding portion 37b. As a result, the second belt unit 78 becomes a state shown in FIG. 12, and the bearing 81 does not come off from the insertion groove 37. Through the process described above, it is possible to attach the transfer unit 66 to the apparatus main body.

After the transfer unit 66 becomes the first state, when the lock member 88 rotates further in the arrow direction C, the hook portion 88d engages a protrusion 38 as an engaged member disposed on the apparatus main body at a specific position thereof. At this moment, the lock member 88 becomes a locked state, and the transfer unit 66 is maintained in the first state. Accordingly, after the transfer unit 66 is attached to the apparatus main body, it is possible to prevent the transfer unit 66 from becoming the second state due to vibration and the likes during a printing operation.

When the lock member 88 becomes the locked state, a space d is formed between the handle bar 83 and a surface of the transfer belt 17. In consideration of a thickness of the sheet and a dimensional variance, it is preferred that the space d is larger than 2 mm, so that the sheet is not obstructed in passing therethrough. Note that the handle bar 83 is disposed at a position not to contact with the image forming units 16Bk, 16Y, 16M, and 16C (refer to FIG. 2).

In the embodiment, in a case of, for example, waiting for a next step or delivery in a manufacturing process of the transfer unit 66, the transfer unit 66 becomes the second state, so that tension is not applied to the transfer belt 17. To this end, when the handle bar 83 is grabbed, the first belt unit 77 and the second belt unit 78 extend and become the bent state, and the hook portion 88c engages the protrusion 30.

As described above, in the embodiment, the transfer unit 66 becomes the second state. Accordingly, in a case of, for example, waiting for a next step or delivery in a manufacturing process of the transfer unit 66, even when the transfer unit 66 stays under a high temperature and a high humidity, it is possible to prevent the transfer belt 17 from forming a curled portion. Further, an external force exceeding an allowance stress of a material of the transfer belt 17 is not applied to the transfer belt 17. Accordingly, it is possible to prevent the transfer belt 17 from being elongated, thereby preventing an elongated state of the transfer belt 17 and improving print quality.

As described above, in the monochrome printing operation, the image forming units 16Y, 16M, and 16C move away from the transfer unit 66, so that only the image forming unit 16Bk forms an image. When the transfer belt 17 is not an elongated state, it is possible to prevent print quality from lowering in the monochrome printing operation as well.

Note that, in a case of, for example, waiting for a next step or delivery in a manufacturing process of the transfer unit 66, when the transfer unit 66 stays in the second state for a long period of time, and the distance Lb between the centers of the bearing 80 and the bearing 81 becomes smaller than that in the first state, the transfer belt 17 may have a loosened portion. At this moment, the idle roller 76 and the cleaning blade 82 sandwich the transfer belt 17. Further, the transfer belt 17 has a bead (not shown) at an edge portion thereof, so that the transfer belt 17 does not move in a skewed state. It is configured that a pulley (not shown) of the idle roller 76 guides the bead.

As described above, the idle roller 76 and the cleaning blade 82 sandwich the transfer belt 17, and the pulley guides the bead of the transfer belt 17. Accordingly, it is possible to prevent the transfer belt 17 from coming off from the first belt unit 77 and the second belt unit 78.

In the embodiment, when the first belt unit 77 and the second belt unit 78 are situated in the second state, it is preferred that an angle between the first belt unit 77 and the second belt unit 78 is determined in consideration of the following factors, in addition to the attachment portion of the apparatus main body.

When the angle between the first belt unit 77 and the second belt unit 78 decreases, tension applied to the transfer belt 17 increases, so that the transfer belt 17 tends to become an elongated state more easily. On the other hand, when the angle between the first belt unit 77 and the second belt unit 78 increases, tension applied to the transfer belt 17 decreases. Accordingly, the transfer belt 17 moves away from the first belt unit 77 and the second belt unit 78, and a portion of the transfer belt 17 becomes free except the portion thereof sandwiched between the idle roller 76 and the cleaning blade 82, so that the transfer belt 17 tends to form a winkled portion or a curled portion more easily.

In consideration of the above factors, it is preferred that the angle between the first belt unit 77 and the second belt unit 78 is set between 15° and 25°, more preferably 20°, thereby preventing the transfer belt 17 from becoming an elongated state, or from forming a winkled portion or a curled portion.

Note that when the first belt unit 77 and the second belt unit 78 are situated in the first state, tension is applied to the transfer belt 17. Accordingly, in this state, when the drive roller 75 rotates, it is possible to move the transfer belt 17.

Second Embodiment

A second embodiment of the present invention will be explained next. Components in the second embodiment similar to those in the first embodiment are designated with the same reference numerals, and explanations thereof are omitted. Explanations of operations and effects in the second embodiment similar to those in the first embodiment are omitted.

Figure 15:
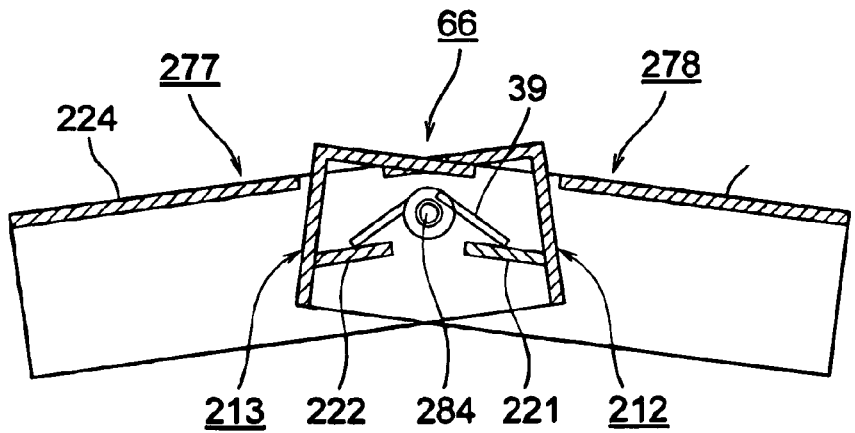
FIG. 15 is a schematic front view showing a transfer unit according to a second embodiment of the present invention.
Figure 16:
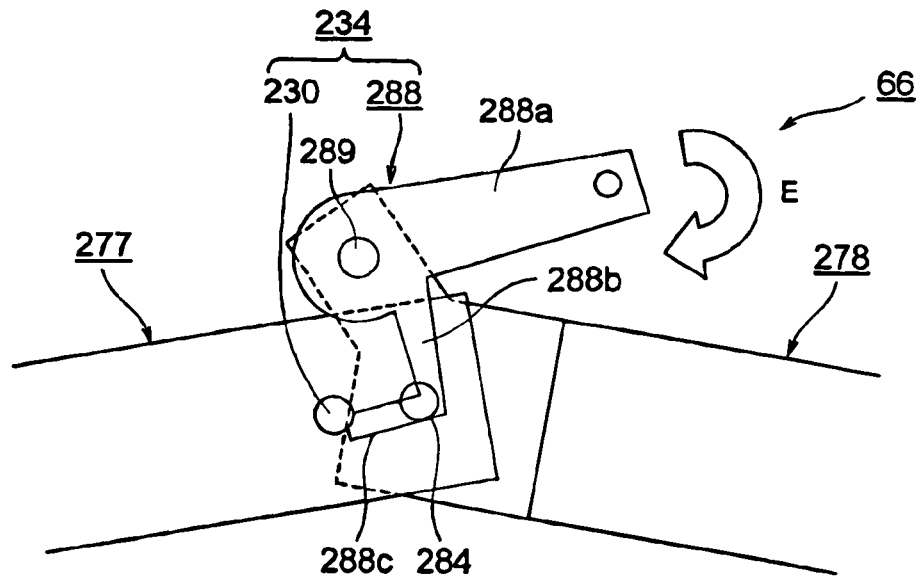
FIG. 16 is a schematic view No. 1 showing an operation of a lock unit for placing the transfer unit in a first state according to the second embodiment of the present invention.
Figure 17:
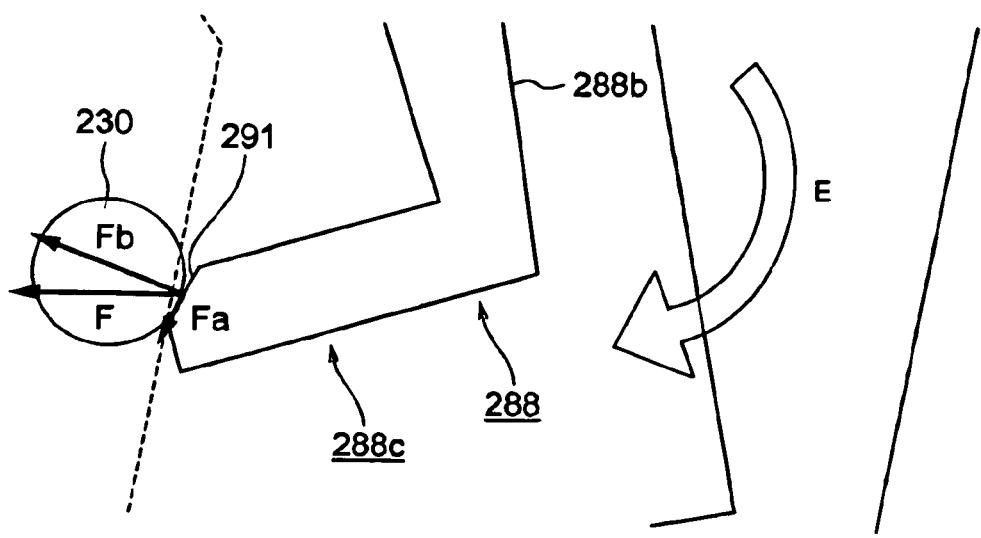
FIG. 17 is a schematic view No. 2 showing the operation of the lock unit for placing the transfer unit in the first state according to the second embodiment of the present invention.
Figure 18:
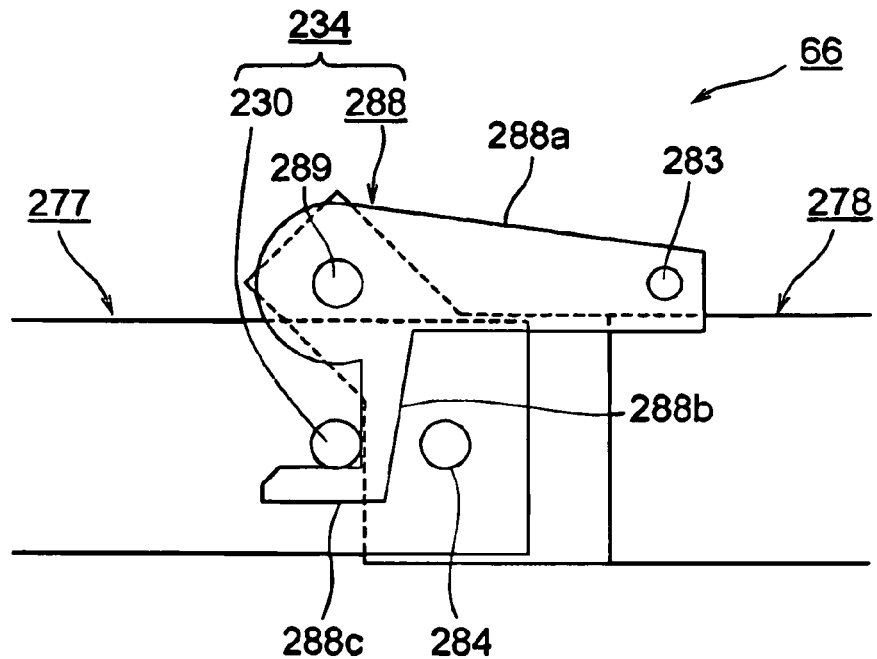
FIG. 18 is a schematic view showing the lock unit when the transfer unit is situated in the first state according to the second embodiment of the present invention.
Figure 19:
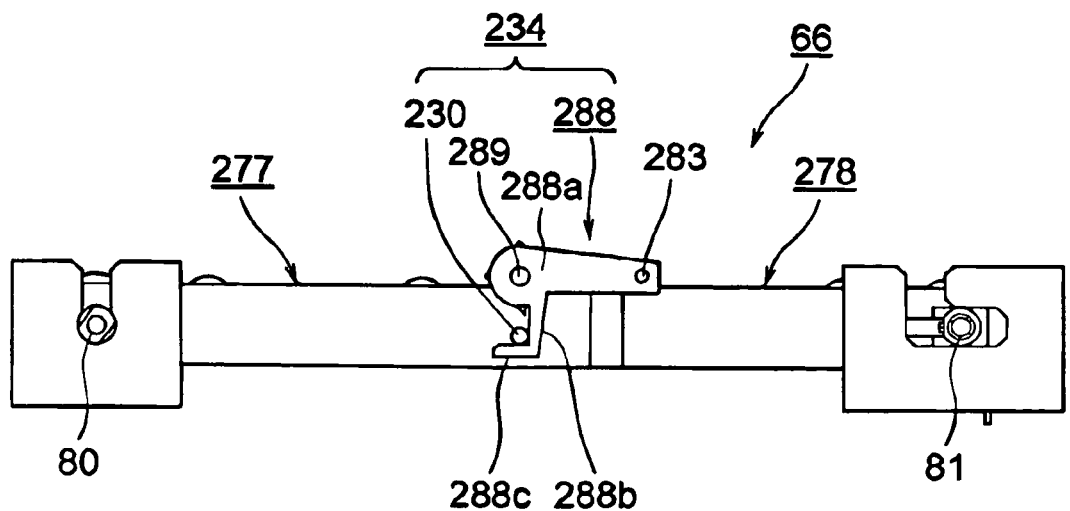
FIG. 19 is a schematic front view showing the transfer unit attached to a printer according to the second embodiment of the present invention.

FIG. 15 is a schematic front view showing the transfer unit 66 according to the second embodiment of the present invention. FIG. 16 is a schematic view No. 1 showing an operation of a lock unit 234 for placing the transfer unit 66 in a first state according to the second embodiment of the present invention. FIG. 17 is a schematic view No. 2 showing the operation of the lock unit 234 for placing the transfer unit 66 in the first state according to the second embodiment of the present invention. FIG. 18 is a schematic view showing the lock unit 234 when the transfer unit 66 is situated in the first state according to the second embodiment of the present invention. FIG. 19 is a schematic front view showing the transfer unit 66 attached to a printer according to the second embodiment of the present invention.

In the embodiment, a first belt unit 277 as a first supporting member is linked to a second belt unit 278 as a second supporting member to be freely rotatable with a connection shaft 284 as a rotational pivot. A torsion spring 39 as an urging member is disposed on the connection shaft 284 for urging the transfer unit 66 as the belt unit to become the second state.

In the embodiment, a protrusion 221 as a supporting portion is disposed on an inner side of a front wall 212 of the first belt unit 277. A protrusion 222 as a supporting portion is disposed on an inner side of a front wall 213 of the second belt unit 278. One end portion of the torsion spring 39 abuts against the protrusion 221, and the other end portion of the torsion spring 39 abuts against the protrusion 222.

When the second belt unit 278 rotates with respect to the first belt unit 277, the front wall 213 of the second belt unit 278 abuts against an upper wall 224 of the first belt unit 277, and the front wall 212 of the first belt unit 277 abuts against an upper wall 225 of the second belt unit 278. Accordingly, the front walls 212 and 213 function as a stopper for preventing the second belt unit 278 from rotating beyond a specific angle.

In the embodiment, the lock unit 234 is disposed between the first belt unit 277 and the second belt unit 278 to switch the transfer unit 66 from the second state to the first state. The lock unit 234 is disposed at each of end portions (right and left) of the transfer unit 66.

The lock unit 204 includes a lock member 288 as an engagement member disposed on one of the first belt unit 277 and the second belt unit 278 (on the second belt unit 278 in the embodiment) to be freely rotatable around a pivot 289. The lock unit 234 further includes a protrusion 230 as an engaged member disposed on the other of the first belt unit 277 and the second belt unit 278 (on the first belt unit 277 in the embodiment).

In the embodiment, the lock member 288 includes a first arm portion 288a extending from the pivot 289; a second arm portion 288b extending from the pivot 289 at a specific angle (a right angle in the embodiment) relative to the first arm portion 288a; and a hook portion 288c as an engagement portion extending from a distal end portion of the second arm portion 288b in parallel to the first arm portion 288a.

When the transfer unit 66 is situated in the first state, the hook portion 288c engages the protrusion 230. A handle bar 283 connects distal portions of the first arm portions 288a, so that the lock members 288 are connected with the handle bar 283.

In the embodiment, in a case of, for example, waiting for a next step or delivery in a manufacturing process of the transfer unit 66, before the transfer unit 66 is placed for a long period of time, the transfer unit 66 is switched to the second state. Accordingly, the first belt unit 277 and the second belt unit 278 are formed in a bent shape as shown in FIG. 16 with an urging force of the torsion spring 39, so that tension is not applied to the transfer belt 17.

In the embodiment, the transfer unit 66 becomes the second state. Accordingly, in a case of, for example, waiting for a next step or delivery in a manufacturing process of the transfer unit 66, even when the transfer unit 66 stays under a high temperature and a high humidity for a long period of time, it is possible to prevent the transfer belt 17 from forming a curled portion or being elongated. Further, an external force exceeding an allowance stress of a material of the transfer belt 17 is not applied to the transfer belt 17. Accordingly, it is possible to prevent the transfer belt 17 from being elongated, thereby improving print quality.

As described above, in the monochrome printing operation, the image forming units 16Y, 16M, and 16C move away from the transfer unit 66, so that only the image forming unit 16Bk forms an image. When the transfer belt 17 is not an elongated state, it is possible to prevent print quality from lowering in the monochrome printing operation.

Further, when the transfer unit 66 is placed on a table and the like in a state that the transfer unit 66 is detached from the apparatus main body, it is possible to maintain the transfer unit 66 in the second state with the urging force of the torsion spring 39.

An operation of attaching the transfer unit 66 to the apparatus main body will be explained next. First, similar to the first embodiment, an operator grabs the handle bar 283, so that the bearing 80 and the bearing 81 are inserted into the insertion groove 34 and the insertion groove 37, respectively. At this moment, the transfer unit 66 is situated in the second state.

In the next step, when the lock member 288 rotates in an arrow direction E, the protrusion 230 contacts with a tapered portion 291 as an abutting portion formed on a distal end portion of the hook portion 288c. Accordingly, as shown in FIG. 17, the tapered portion 291 pushes the protrusion 230 with a force F. At this moment, the tapered portion 291 pushes the protrusion 230 with a component force Fa, and the second arm portion 288b and the hook portion 288c deform with a component force Fb, so that the tapered portion 291 slides along a surface of the protrusion 230. As a result, as shown in FIG. 18, the hook portion 288c engages the protrusion 230, so that the transfer unit 66 becomes the first state, thereby attaching the transfer unit 66 to the apparatus main body.

In the embodiment, a recess portion may be formed in the lock member 288 at a position contacting with the protrusion 230 when the transfer unit 66 becomes the first state. With the recess portion, it is possible to securely engage the lock member 288 with the protrusion 230.

As described above, in the embodiment, the transfer unit 66 is maintained in the second state with the urging force of the torsion spring 39. Accordingly, it is possible to maintain the transfer belt 17 in the loosened state. As a result, when the transfer unit 66 is detached from the apparatus main body, it is possible to securely prevent the transfer belt 17 from forming the curled portion or being in the elongated state.

In the embodiments described above, the present invention is applied to the transfer unit 66 disposed in the printer, and may be applicable to a copier, a facsimile, and a multifunction product using a belt unit.

The disclosure of Japanese Patent Application No. 2007-245102, filed on Sep. 21, 2007, is incorporated in the application by reference.

While the invention has been explained with reference to the specific embodiments of the invention, the explanation is illustrative and the invention is limited only by the appended claims.

What is claimed is:

1. A belt unit comprising:
   a first roller;
   a second roller;
   a belt extended with at least the first roller and the second roller;
   a first supporting member for supporting the first roller;
   a second supporting member disposed to be freely rotatable relative to the first supporting member for supporting the second roller;
   a switching member for switching the first supporting member and the second supporting member between a first state for applying tension to the belt and a second state for loosening the belt; and
   a regulating member for regulating the second supporting member to rotate.
   said switching member includes a first engagement member attached to one of the first supporting member and the second supporting member to be freely rotatable and a first engaged member attached to the other of the first supporting member and the second supporting member for engaging the first engagement member so that the first supporting member and the second supporting member are maintained in the second state when the switching member rotates.

2. The belt unit according to claim 1, further comprising an urging member for urging one of the first supporting member and the second supporting member so that the first supporting member and the second supporting member are maintained in the second state.

3. The belt unit according to claim 1, wherein said switching member includes an engagement member attached to one of the first supporting member and the second supporting member to be freely rotatable for engaging a second engaged member so that the first supporting member and the second supporting member are maintained in the second state when the switching member rotates.

4. An image forming apparatus comprising the belt unit according to claim 1.

5. The image forming apparatus according to claim 4, further comprising an apparatus main body, said belt unit being detachably attached to the apparatus main body.

6. A belt unit comprising:
   a belt;
   a first roller;
   a second roller;
   a first supporting member for supporting the first roller;
   a second supporting member for supporting the second roller; and
   a lock member disposed on the first supporting member for holding the belt unit between a first state for applying tension to the belt and a second state for loosening the belt, said lock member being arranged to switch the belt unit from the second state to the first state when the belt unit is attached to an apparatus.

7. The belt unit according to claim 6, wherein said lock member includes a first engagement portion for holding the first supporting member in the first state and a second engagement portion for holding the first supporting member in the second state.

8. The belt unit according to claim 7, wherein said second supporting member includes an engaged portion for engaging the first engagement portion in the second state so that the belt unit is maintained in the second state.

9. The belt unit according to claim 6, wherein said lock member is arranged to rotate toward the first supporting member so that the belt unit is maintained in the second state, and to rotate away from the first supporting member so that the belt unit is maintained in the first state.

10. The belt unit according to claim 6, wherein said first roller is arranged to increase a distance between the first roller and the second roller to extend the belt when the belt unit is switched from the second state to the first state.

11. The belt unit according to claim 6, wherein said lock member is arranged to rotate when the belt unit is attached to the apparatus.

12. The belt unit according to claim 6, wherein said first roller is arranged to increase a distance between the first roller and the second roller to extend the belt when the belt unit is attached to the apparatus.

13. An image forming apparatus comprising the belt unit according to claim 6.

14. The image forming apparatus according to claim 13, further comprising an apparatus main body, said belt unit being detachably attached to the apparatus main body.

15. The belt unit according to claim 9, wherein said lock member is arranged to rotate to protrude so that the belt unit is maintained in the second state, and is arranged to rotate to fall so that the belt unit is maintained in the first state.

16. A belt unit comprising:
    a belt;
    a first roller;
    a second roller;
    a first supporting member for supporting the first roller;
    a second supporting member for supporting the second roller;
    a lock member disposed on the first supporting member for holding the belt unit between a first state for applying tension to the belt and a second state for loosening the belt; and
    an urging member for urging the first supporting member and the second supporting member.

17. The belt unit according to claim 16, wherein said urging member is disposed between the first supporting member and the second supporting member.

18. The belt unit according to claim 16, wherein said urging member includes two end portions, one of said end portions abutting against the first supporting member, the other of said end portions abutting against the second supporting member.

19. The belt unit according to claim 16, wherein said lock member includes a first engagement portion for holding the first supporting member in the first state and a second engagement portion for holding the first supporting member in the second state.

20. The belt unit according to claim 16, wherein said lock member is arranged to rotate toward the first supporting member so that the belt unit is maintained in the second state, and to rotate away from the first supporting member so that the belt unit is maintained in the first state.

21. The belt unit according to claim 16, wherein said first roller is arranged to increase a distance between the first roller and the second roller to extend the belt when the belt unit is switched from the second state to the first state.

22. The belt unit according to claim 16, wherein said lock member is arranged to rotate when the belt unit is attached to an apparatus.

23. The belt unit according to claim 16, wherein said first roller is arranged to increase a distance between the first roller and the second roller to extend the belt when the belt unit is attached to an apparatus.

24. The belt unit according to claim 19, wherein said lock member is arranged to rotate to protrude so that the belt unit is maintained in the second state, and is arranged to rotate to fall so that the belt unit is maintained in the first state.

25. An image forming apparatus comprising the belt unit according to claim 16.

26. The image forming apparatus according to claim 25, further comprising an apparatus main body, said belt unit being detachably attached to the apparatus main body.

* * * * *